United States Patent

[11] 3,598,033

| | | |
|---|---|---|
| [72] | Inventor | Tetsuo Sasaki<br>Iruma-gun, Japan |
| [21] | Appl. No. | 772,613 |
| [22] | Filed | Nov. 1, 1968 |
| [45] | Patented | Aug. 10, 1971 |
| [73] | Assignee | Asahi Kogaku Kogyo Kabushiki Kaisha<br>Tokyo-to, Japan |
| [32] | Priority | Nov. 20, 1967 |
| [33] | | Japan |
| [31] | | 42/74559 |

[54] CAMERA FILM AUTOMATIC WIND AND REWIND MECHANISM
8 Claims, 3 Drawing Figs.

[52] U.S. Cl. .................................................. 95/31 EL,
242/71.6, 352/124
[51] Int. Cl. .................................................. G03b 1/12,
G03b 19/04
[50] Field of Search .......................................... 95/31;
352/124; 242/71.5, 71.6

[56] References Cited
UNITED STATES PATENTS

| | | | |
|---|---|---|---|
| 2,969,722 | 1/1961 | Schwartz...................... | 242/71.6 X |
| 3,385,189 | 5/1968 | Hennig et al. ................ | 95/31 |
| 3,448,669 | 6/1969 | Suzuki.......................... | 95/31 AC |
| 3,448,670 | 6/1969 | Suzuki.......................... | 95/31 AC |
| 3,494,691 | 2/1970 | Katsuyama.................. | 352/124 |

*Primary Examiner*—Samuel S. Matthews
*Assistant Examiner*—Joseph F. Peters, Jr.
*Attorney*—Stanley Wolder

ABSTRACT: A camera automatic wind and rewind mechanism which includes an electric motor coupled through a first clutch to the rewind spindle and through a second clutch and a torque limiting clutch to the film takeup spool. The device includes a mechanism which releasably and alternatively couples the takeup spool and the rewind member to the electric motor and consists of a film advance control first network, a film rewind control second network, a battery, and a first switch for alternatively connecting the battery through the first and second networks simultaneously with the coupling of the takeup spool and rewind member to the motor.

FIG-1

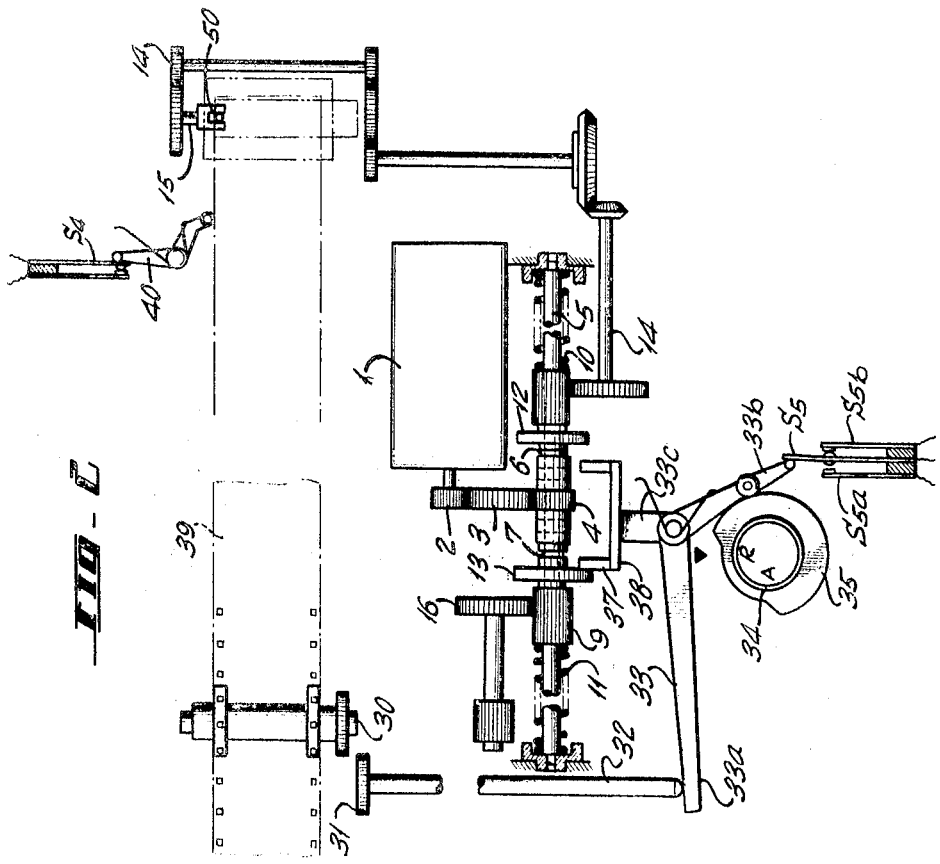

3,598,033

1

CAMERA FILM AUTOMATIC WIND AND REWIND MECHANISM

BACKGROUND OF THE INVENTION

The present invention relates generally to improvements in cameras and it relates particularly to an improved film advancing and rewind mechanism.

Various arrangements have been proposed and employed for the automatic winding of film in cameras utilizing conventional perforated 36 mm. film and an electric driving motor. With such automatic film-winding cameras, the exposed film is manually rewound by means of a rewinding knob or crank attached to the camera body. Although there are known automatic film-rewinding mechanisms these require a complicated operation and are therefore inconvenient to handle. Moreover these mechanisms are unreliable and possess other drawbacks and disadvantages.

SUMMARY OF THE INVENTION

It is a principal object of the present invention to provide an improved camera film wind and rewind mechanism.

Another object of the present invention is to provide an improved automatic electric motor-driven camera film wind and rewind mechanism.

Still another object of the present invention is to provide an electric motor-driven camera film wind and rewind mechanism which automatically advances the film a single frame and automatically rewinds the film until it is disengaged from the film takeup reel.

A further object of the present invention is to provide a mechanism of the above nature characterized by its reliability, ruggedness, convenience, adaptability and versatility.

The above and other objects of the present invention will become apparent from a reading of the following description taken in conjunction with the accompanying drawings which illustrate a preferred embodiment thereof.

In a sense the present invention contemplates the provision of a camera film-advancing and rewind mechanism comprising a film takeup member, a film rewind member, an electric motor, a first means for releasably alternatively coupling said takeup member and said rewind member to said motor, a film advance control first network, a film rewind control second network, a battery, and first switch means for alternatively connecting said battery through first and second networks simultaneously with the coupling of said takeup and rewind members respectively to said motor.

According to a preferred form of the improved mechanism the coupling means includes a shaft coupled to the motor and provided with first and second clutches connected to the film takeup and rewind spindles respectively, a torque-limiting clutch being in the train between the first clutch and takeup spindle. The camera film sprocket wheel is coupled to the takeup spindle by a gear which is disengaged with the selection of the film rewind condition.

The improved automatic film advance and rewind mechanism is reliable and easy and convenient to use and highly versatile and adaptable.

BRIEF DESCRIPTION OF THE DRAWING

FIG. 1 is a fragmentary front elevational view of an improved film wind and rewind mechanism embodying the present invention shown in a film wind condition;

FIG. 2 is a view similar to FIG. 1, the mechanism being shown in a film rewind condition, and FIG. 3 is a circuit diagram of the control network thereof.

DESCRIPTION OF THE PREFERRED EMBODIMENT

Referring now to the drawings which illustrate a preferred embodiment of the present invention, the reference numeral 1 designates an electric motor coupled through gears 2 and 3 to a driving gear 4 fixed to approximately the midpoint of a long main shaft 5. On both sides of the driving gear 4 there are provided coupling gears 8 and 9 which are rotatably and axially slideably mounted on shaft 5. The gears 8 and 9 are inwardly urged along shaft 5 by springs 10 and 11 respectively, carried by shaft 5. Coupling clutches 6 and 7 are provided between the gears 4 and 8 and between the gears 4 and 9 respectively. The coupling gear 8 is coupled through a right-angle coupling shaft and gear arrangement 14 to a film rewinding shaft 15, while the coupling gear 9 is coupled through a coupling arrangement 16 to a driving section 18 of a torque-limiting slip joint mechanism 17. This slip joint mechanism 17 is so arranged that the driving section 18 and a cooperating driven section 19 rotate together when a relatively small film-winding load is exerted upon the driven section 19 so that the rotation of the electric motor 1 is transmitted to a film-winding shaft 20 by way of a gear train while when the load on the driven section 19 becomes excessive the driving section 18 slips relative to the driven section 19 so that the transmission of the rotation is stopped. Between such power transmission and slip operations the driving section 18 moves along the shaft 22 due to the action of a steel ball 21 registering with recesses in the confronting faces of sections 18 and 19, and this movement causes the flange 23 of the driving section 18 to operate a switch lever 24 normally spring urged against flange 23 so as to actuate or change over a double-throw switch $S_3$ of the electrical circuit to be described later.

A film-winding spool 25 is loosely fitted to said film-winding shaft 20. A joint member which is integral with the film-winding shaft 20 engages an eccentric pin 27 fixed to a gear 26 which is integral with film-winding spool 25 so that the rotation of the film-winding shaft 20 causes the film-winding spool 25 to be rotated. The gear 26 which is integral with the film-winding shaft 20 engages a coupling gear 29. Between the gear 29 and a film-winding sprocket shaft there is provided a disengageable intermediate gear 31. A supporting shaft 32 of gear 31 is suitably rotatably and axially movably mounted. The end of the shaft 32 remote from the gear 31 abuts against one arm 33a of a three-armed lever 33.

A change over or selector knob 34 is provided with an integral cam plate 35 whose cam surface is engaged by a follower mounted on an arm 33b of the three-armed lever 33. The end of lever arm 33b engages the resilient arm of a double-throw changeover switch $S_5$. The third arm 33c of lever 33 supports a change over member 38 with upright projections 36 and 37 arranged on both ends thereof respectively. Located in the path of movement of the changeover member 38 there are flanges 12 and 13 which are respectively integral with the slideable coupling gears 8 and 9 on shaft 5.

Along the transportation path of the camera film 39 there is positioned one arm of a film-sensing lever 40 whose other arm is positioned to actuate a switch S4 to be described later. The changeover or selector knob 34 is provided with a registration index 41.

The control network is illustrated in FIG. 3 and includes a battery E one terminal of which is connected to a terminal of motor 1 and the other terminal of which is connected to the arm of a manually actuated film frame advance double-throw switch S1 including a normally closed contact S1b and a normally open contact S1a. The contact S1b is connected to the arm of wind-rewind selector switch S5 including alternatively closed contacts S5a and S5b. The contact S5b is connected through switch S4 to the other terminal of motor 1, switch S4 being normally open and being closed by sensing lever 40 in the presence of film 39 along its transportation path.

Switch contact S5a is connected through a frame counter controlled switch S2 to be normally closed and to be opened after a predetermined number of film frame advances, to a contact S3b of a double-throw switch S3 which is controlled by lever 24 as aforesaid. The arm of switch S3 is connected to the other terminal of motor 1 and the other contact S3a of switch S3 is connected to contact S1a of switch S1.

Figure 1:
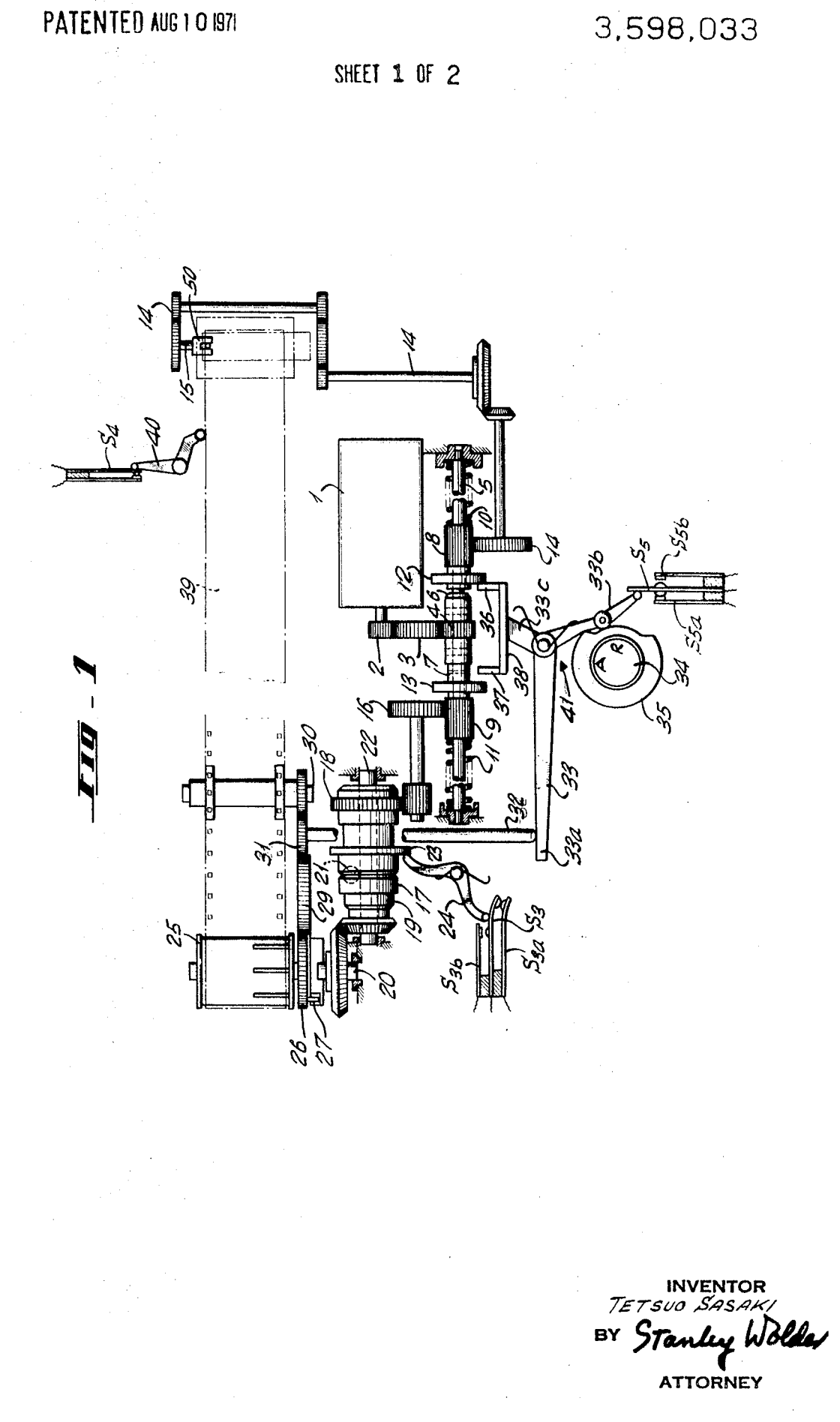

Considering now the operation of the mechanism described above, when the change over knob 34 is set to position the indicator mark A in registration with the index 41, the arm 33b is pushed by the projecting portion of the cam plate 35 so that the lever 33 is swung under spring influence clockwise as shown in FIG. 1 and causes the projection 36 of the changeover member 38 to push the flange 12 of the coupling gear 8 to the right against the action of the spring 10. Accordingly, the gear 8 is disengaged from the driving gear 4 by the opening of the clutch 6 while, on the other hand, the movement of the changeover member 38 brings the coupling clutch 7 on the side of the coupling gear 9 into engagement due to the action of the spring 11.

Now, when the electric motor 1 is energized its rotation is transmitted through the gears 2, 3 and 4 to the coupling gear which is coupled to the coupling clutch 7, and further through the coupling arrangement 16 to the driving section 18 of the slip-joint mechanism 17. When the photographing operation is completed and the film can be wound, the slip-joint mechanism 17, the driving section 18 and the driven section 19 rotate together. Accordingly, the rotation of the electric motor 1 is transmitted through coupling clutch 7 and the slip-joint mechanism 17 to the film-winding shaft 20. Thus, the joint member 28 which is integral with shaft 20 is rotated, engaging the pin 27 fixed to the gear 26. This causes the film-winding spool 25 to be rotated, thus winding the film 39.

When the increasing load due to film-winding operation reaches its maximum value, that is, when one film frame has been wound and, due to the action of the constant length film-winding mechanism (not shown), the coupling gear 29 engaging said gear 26 and the sprocket 30 driven through the intermediate gear 31 are prevented from rotating, the driving section 18 of the slip-joint mechanism 17 is separated from the driven plate portion 19 by ball 21 as previously described so that the film-winding mechanism is relaxed. Then, through the action of members constituting film-winding mechanism (not shown), the shutter release operation is effected and photographing operation is performed. The continuing operation of the electric motor 1 causes the slip-joint mechanism 17 to be again brought into the state of engagement. Thus the arrangement proceeds to the photographing operation with respect to the next film frame.

Such film-winding operation is automatically repeated until all the film is wound, when the film frame counter switch S2 shown in FIG. 3 is opened so that current supply to the electric motor 1 is automatically stopped, thus stopping the operation of the electric motor 1 and the film-winding operation.

The coupling operation of the electrical circuit in the above mentioned film-winding operation is as follows:

When the starting switch $S_1$ is depressed, the electric connection is changed over from the contact $S_{1b}$ to the contact $S_{1a}$. At this time, in the changeover switch $S_3$ the contact $S_{3a}$ is kept closed by the switch lever 24 which is controlled by the flange 23 of slip-joint mechanism 17, so that the electric motor 1 is energized. During the slip operation of the slip-joint mechanism 17 due to the operation of electric motor 1 the shutter release operation is carried out, and the continued operation of the electric motor 1 after completion of shutter release causes the slip-joint mechanism 17 to go into driving power transmitting state (the driving section 18, which has been separated from the driven section 19 during the slip operation due to the action of the steel ball, is brought into pressing contact with the driven section 19 since the ball 21 is brought into registry with opposing recesses, the driving plate portion 18 being moved to the left, which causes lever 24 to changeover the switch $S_3$ from the contact $S_{3a}$ to the contact $S_{3b}$. The changeover knob 34 is set to film-winding position so that in the changeover switch $S_5$ the contact $S_{5a}$ is closed. Accordingly, when the starting switch $S_1$ is released and therefore it is changed over to the contact $S_{1b}$, the automatic current supply circuit is closed. Then, the electric motor 1 is again put into operation and performs film winding operation.

The disengagement of the driving section 18 of the slip-joint mechanism 17 upon completion of said film-winding operation (the movement to the right of the driving section 18 due to the action of the steel ball 21) causes the switch $S_3$ to be changed over to the contact $S_{3a}$. This opens the automatic current supply circuit so that the electric motor 1 is stopped, Then, upon depression of said starting switch $S_1$ the manual current supply circuit is closed so that the electric motor 1 starts she shutter release actuating operation. The above-mentioned operation is repeated to perform the control and coupling operations in relation to the film-winding mechanism.

In order to rewind the exposed film into the magazine the changeover knob 34, which is manually operable from the outside of the camera, is rotated counterclockwise so as to bring the position marked R into registration with the index 41. This causes the projecting portion of the cam plate 35 of the changeover knob 34 to push the lever arm 33b to cause lever 33 to be swung counterclockwise so that the changeover member 38 fixed to the lever arm 33c is moved to the left causing the coupling clutch 7 to be disengaged from the coupling gear 9 and bringing the coupling clutch 6 into engagement with the coupling gear 8. This state is shown in FIG. 2.

Since lever arm 33a abuts against the shaft 32 of the intermediate gear 31 which engages the gear of the sprocket shaft 30, upon swinging of the lever 33 due to the above-mentioned operation the shaft 32 moves down so that the intermediate gear 31 is disengaged from the gear of the sprocket shaft 30. Thus the sprocket shaft 30 is idled.

Further, lever arm 33b acts on the changeover switch $S_5$ for controlling the current supply circuit for the electric motor 1 and changes it over from the contact $S_{5a}$ to the contact $S_{5b}$. This starts the current supply to the electric motor 1, putting the motor into operation. The motor rotation is transmitted through the coupling arrangement 14 to the film-rewinding shaft 15. A projection 50 which is integral with the film-rewinding shaft 15 engages the end forked portion of the rewinding crank so that the magazine shaft is rotated and accordingly the film 39 is rewound into the magazine.

When the film-rewinding operation is completed, the lever 40 is now released from the action of the film 39 due to passage of the film 39 from engagement therewith so that is swings clockwise due to the action of a spring. This causes the switch $S_4$ to be opened so that the electric motor 1 is automatically deenergized and stopped.

Thus, in the arrangement according to the present invention, in parallel with the current supply circuit for the electric motor for automatic film-winding operation there is provided a current supply circuit for automatic film-rewinding operation; and in drive connection with the changeover operation between these circuits disengagement and control operations of the film-winding coupling mechanism and the film-rewinding coupling mechanism in the driving power transmitting system are performed. Thus film-rewinding operation can be automatically carried out by utilizing the electric motor for film-winding operation. Further, the structure and the operation of the arrangement for such purpose is very simple and easy. With the arrangement according to the present invention, it is possible that the electric motor be stopped upon completion of film-rewinding operation by inserting a switch, which is under control of a film-rewinding completion sensing device, serially in the film-rewinding current supply circuit. Thus, the present invention provides a greatly improved film-rewinding operation, providing accordingly a greatly improved camera of the automatically film-rewinding type.

While there has been described and illustrated a preferred embodiment of the present invention, it is apparent that numerous alterations, omissions and additions may be made without departing from the spirit thereof.

I claim:

1. A camera film-advancing and rewind mechanism comprising a film takeup member, a film rewind member, an electric motor, a first means for releasably alternatively coupling said takeup member and said rewind member to said motor, a film advance control first network, a film rewind control second network, a battery, first switch means for alternatively connecting said battery though first and second networks simultaneously with the coupling of said takeup and rewind members respectively to said motor, said second network including a second switch connected in series with said first switch means between said motor and battery, and means responsive to the presence of film extending between said takeup and rewind members for opening said switch in the absence of said film.

2. The mechanism of claim 1 wherein said first switch means includes a double throw switch including first and second terminals connected to said first and second networks respectively, and a third terminal alternatively connected to said first and second terminals and connected to said battery.

3. The mechanism of claim 2 including a manually operable switch connected in series between said battery and said first switch means third terminal.

4. The mechanism of claim 2 wherein said second switch is connected between said motor and said double throw switch second terminal.

5. The mechanism of claim 2 wherein said first network comprises a third switch connected between said motor and said double throw switch first terminal, and means responsive to the torque on said takeup member for opening said third switch.

6. The mechanism of claim 5 including a normally closed switch connected in series with said third switch between said double throw switch first terminal and said motor and adapted to be opened by the camera frame counter.

7. A camera film-advancing and rewind mechanism comprising a film takeup member, a film rewind member, an electric motor, a first means for releasably alternatively coupling said takeup member and said rewind member to said motor, a film advance control first network, a film rewind control second network, a battery, and first switch means for alternatively connecting said battery through first and second networks simultaneously with the coupling of said takeup and rewind members respectively to said motor, said first coupling means comprising first and second clutches coupling said takeup and rewind members respectively to said motor and means for selectively disengaging said clutches.

8. The mechanism of claim 7 including a sprocket member positioned between said takeup and rewind members, means coupling said sprocket member to said motor, and means responsive to the disengagement of said first clutch for uncoupling said sprocket member from said motor.